(12) United States Patent
Chen et al.

(10) Patent No.: US 8,593,260 B2
(45) Date of Patent: *Nov. 26, 2013

(54) SYSTEM AND METHOD FOR VARYING RESPONSE AMPLITUDE OF RADIO TRANSPONDERS

(75) Inventors: Han Chen, White Plains, NY (US); Daniel J. Friedman, Sleepy Hollow, NY (US); Paul A. Moskowitz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 12/779,103

(22) Filed: May 13, 2010

(65) Prior Publication Data

US 2010/0214078 A1 Aug. 26, 2010

Related U.S. Application Data

(63) Continuation of application No. 11/562,355, filed on Nov. 21, 2006, now Pat. No. 7,791,453.

(51) Int. Cl.
*H04Q 5/22* (2006.01)
(52) U.S. Cl.
USPC ...... 340/10.5; 340/10.2; 340/10.1; 340/572.1
(58) Field of Classification Search
USPC ................ 340/10.1, 10.2, 10.3, 10.33, 10.34, 340/10.5, 572.1
See application file for complete search history.

(56) References Cited

U.S. PATENT DOCUMENTS

| | | | |
|---|---|---|---|
| 3,713,148 A | 1/1973 | Cardullo et al. | |
| 5,396,251 A | 3/1995 | Schuermann | |
| 5,500,651 A | 3/1996 | Schuermann | |
| 5,926,110 A * | 7/1999 | Downs et al. | 340/10.51 |
| 6,084,512 A | 7/2000 | Elberty et al. | |
| 6,685,096 B1 * | 2/2004 | Degrauwe et al. | 235/492 |
| 6,946,950 B1 | 9/2005 | Ueno et al. | |
| 7,260,371 B1 * | 8/2007 | Yones | 455/186.1 |
| 2005/0237160 A1 | 10/2005 | Nolan et al. | |
| 2006/0012464 A1 * | 1/2006 | Nitzan et al. | 340/10.1 |
| 2006/0061475 A1 | 3/2006 | Moskowitz et al. | |
| 2006/0061476 A1 | 3/2006 | Patil et al. | |
| 2006/0132313 A1 | 6/2006 | Moskowitz | |
| 2006/0145851 A1 | 7/2006 | Posamentier | |

OTHER PUBLICATIONS

International Search Report and Written Opinion, Mailed Sep. 26, 2008 in corresponding international application No. PCT/US07/71621.

* cited by examiner

*Primary Examiner* — Edwin Holloway, III
(74) *Attorney, Agent, or Firm* — August Law, LLC; George Willinghan

(57) ABSTRACT

A system and method are provided for modifying the effective reading range of an radio frequency identification tag. The tag, a chip-based tag, includes an antenna and a chip in communication with the antenna. The chip includes circuitry including field effect transistors that can modify the effective reading range of the tag by modifying characteristics of the tag including the modulation depth of the backscatter signal, the impedance characteristics of the tag front end electronics, the power consumption characteristics and the threshold power-on voltage of the tag. These characteristics are change either temporarily or permanently in response to commands communicated to the tag from a radio frequency identification reader.

14 Claims, 9 Drawing Sheets

SYSTEM AND METHOD FOR VARYING RESPONSE AMPLITUDE OF RADIO TRANSPONDERS

CROSS-REFERENCE TO RELATED APPLICATIONS

The present application is a continuation of U.S. patent application Ser. No. 11/562,355 filed Nov. 21, 2006, which issued as U.S. Pat. No. 7,791,453 on Sept. 2, 2010. The entire disclosure of that application is incorporated herein by reference.

FIELD OF THE INVENTION

The present invention relates to radio frequency identification systems and methods for the use of these systems.

BACKGROUND OF THE INVENTION

Portable transponders employing Radio Frequency Identification (RFID) are used in a variety of applications including to collect highway tolls, to provide personal identification for access control and to provide electronic information interchange, i.e. credit. Passive RFID tags, i.e., tags without internal power sources such as batteries, and wireless cards contain chips, for example computer chips, microchips and memory chips, that store data or information such as identification information, credit card numbers and financial data. These passive tags are applied to items and provide identification information in much the same way as machine-readable optical tags such as bar codes are used. The data or information stored on a tag or wireless card is retrieved using an RFID base station or reader. The reader transmits radio waves that cause the tag or card to transmit information stored on the tag, which is then received and interpreted by the reader. Since the tag or card is a passive device without a source of power, power is derived form the interrogation field transmitted by the reader, e.g., the interrogation field excites a coil within the tag or card.

Examples of passive tags are described in U.S. Pat. No. 3,713,148. In its simplest form the RFID tag includes a circuit, typically in the form of a single silicon chip although more than one chip may be used in the construction of the RFID tag. This circuit is generally connected to an antenna. The RFID tag is incorporated in a desired device such as an identification tag, a key fob or an identification card. For battery assisted tags, sometimes referred to as semi-passive or semi-active, a battery may also be employed to extend the range of the tag. It is also possible in principle to build devices that function as tags or wireless cards using electrical circuits including only resistors, capacitors and inductors as is well known by those skilled in the art.

One application for RFID is in the tracking of goods as these goods move through the supply chain from manufacturers through retailers to consumers. For example, RFID tagging will be used for point of sale (POS) check out and data collection. For the item tagging application, RFID tags are attached to an item or the packaging of the item that is being inventoried or that is being offered for sale. The tag in many cases remains attached to the item after that item has been sold to a customer. Since the tag is still active, that tag can be read after sale while the item is in the possession of the consumer, raising consumer privacy concerns. One method to alleviate these concerns is to deactivate or to disable the RFID tag after sale without actually having to physically remove the tag.

The EPCglobal Generation 2, Gen2, RFID protocol includes a kill command that renders the tag inoperable. This kill command is often referred to as a "Privacy" command, which can be used to permanently deactivate the device at the end of its working life, for example as a customer leaves a store. However, there are problems associated with the kill command. For example, if the kill command permanently disables a tag, then the tag may not be used for future applications including use of the tag for recalls or returns.

SUMMARY OF THE INVENTION

Systems and methods in accordance with the present invention provide for the modification and partial deactivation of an RFID tag by controlling the amplitude of the backscatter radiation that the tag uses to communicate with an RFID base station or reader. In one embodiment, the function of the chip component of an RFID tag or transponder, including the circuitry included in the chip component, is controlled to alter the tag function to inhibit the ability of a base station or reader to interrogate the RFID tag or transponder by wireless means for those tags that have been instructed by wireless means to limit the efficiency of the communications with the tag. Systems and methods in accordance with the present invention can provide for both the permanent and temporary modification, deactivation or disabling of wireless RFID tags. A typical RFID tag is a chip-based tag that includes an antenna and a chip in communication with the antenna. The chip includes circuitry and in particular front end circuitry that can modify the effective reading range of the tag in response to a command from an RFID reader.

In one embodiment of a method for controlling a radio frequency identification system in accordance with the present invention, at least one command from a radio frequency identification reader is communicated to a chip-based radio frequency identification tag that includes an antenna and a chip in communication with the antenna. The effective reading range of the radio frequency identification tag is then modified in response to the communicated command. In one embodiment, modification of the effective reading range of the tag includes adjusting the effective reading range between a maximum reading range and a minimum reading range. In one embodiment, modification of the effective reading range of the tag includes reducing a modulation depth of a backscatter signal transmitted by the radio frequency identification tag in response to an interrogation signal from the radio frequency identification reader. Reduction of the modulation depth includes modulating impedance values between the antenna and the chip between two modulation states and limiting impedance difference between the two modulation states.

In one embodiment, modification of the effective reading range of the tag includes modifying the impedance characteristics of front end electronics in the chip. In another embodiment power consumption characteristics of the radio frequency identification tag are modified in order to modify the effective reading range of the tag. For example, an additional power drain such as a field-effect transistor is incorporated in a power path of the tag. In one embodiment, modification of the effective reading range further involves modifying the level of incident power sufficient to operate the chip in the tag, for example by changing the threshold voltage of a power-on reset circuit capable of activating circuitry in the chip.

In one embodiment of an exemplary method for locating an object using a radio frequency identification system in accordance with the present invention, at least one interrogation signal is communicated to a chip-based radio frequency identification tag containing an antenna and a chip in communication with the antenna. At least one response signal is transmitted from the radio frequency identification tag to each one of a plurality of radio frequency identification readers. The effective reading range of the transmitted response signal is reduced over time until a minimum effective reading range of the transmitted response signal is identified for each one of the plurality of radio frequency identification readers. A location of the radio frequency identification tag is determined based upon the identified minimum effective reading ranges.

In one embodiment, the interrogation signal is communicated to each one of a plurality of chip-based radio frequency identification calibration tags that each contain an antenna and a chip in communication with the antenna. Each calibration tag is located a known distance form each one of the plurality of radio frequency identification readers. A response signal is transmitted from the calibration tags tag to each one of a plurality of radio frequency identification readers, and the effective reading range of the transmitted response signals are reduced over time. The minimum effective reading range of the transmitted response signal is identified for each calibration tag and radio frequency identification reader, and the effective reading range between each calibration tag and radio frequency identification reader is associated with the known distance. These associations between effective reading ranges and distances are used to determine the location of the radio frequency identification tag. In one embodiment, the electrical characteristics of front end electronics in the chip of the radio frequency identification tag are modified in order to reduce the effective reading ranges.

In one exemplary embodiment, a radio frequency identification system is provided having a radio frequency identification tag capable of receiving interrogation signals and commands from a radio frequency identification reader. The radio frequency identification tag includes an antenna and a chip in communication with the antenna. The chip includes circuitry capable of modifying an effective reading range of the radio frequency identification tag. In one embodiment, the circuitry includes two or more field-effect transistors such as N-channel metal-oxide-semiconductor field-effect transistors. In one embodiment, the chip also includes power recovery circuitry capable of recovering and storing energy from the interrogating signal. This circuitry includes a switch and capacitor in parallel with the power recovery circuitry. In one embodiment, this switch is an N-channel metal-oxide-semiconductor field-effect transistor. In one embodiment, the chip includes power recovery circuitry capable of recovering and storing energy from the interrogating signal. This circuitry includes a field-effect transistor in parallel with the power recovery circuitry and capable of introducing additional power drain. In one embodiment, the circuitry also includes a power on reset circuit.

DETAILED DESCRIPTION

Figure 1:
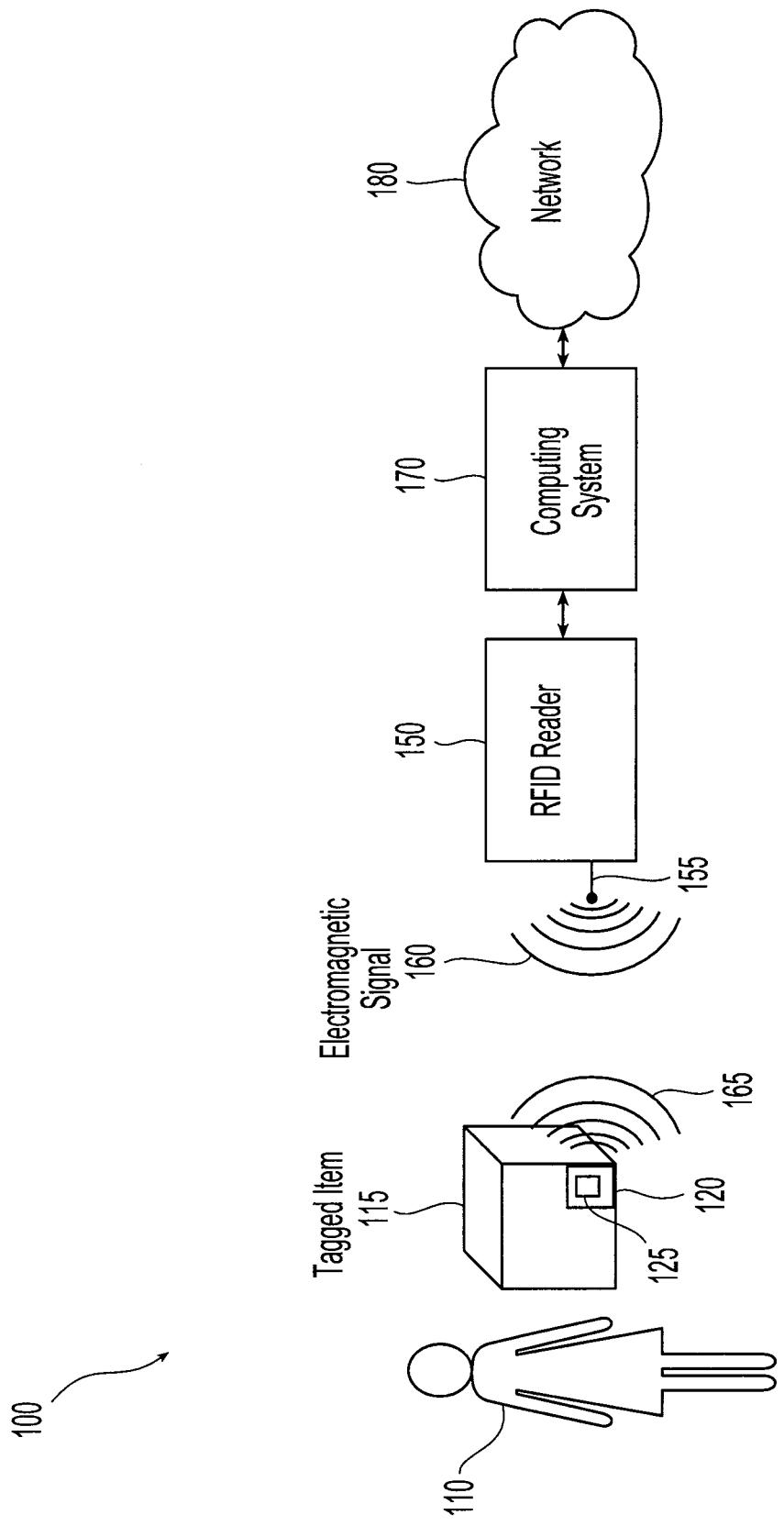
FIG. 1 is a schematic representation of an embodiment of an RFID system.

Referring initially to FIG. 1, an exemplary embodiment of a radio frequency identification (RFID) system 100 for use in accordance with the present invention is illustrated. A user 110, for example a person, customer, worker or cardholder, carries an item 115 that has at least one attached wireless or RFID tag 120. The RFID tag includes an antenna 125 and a chip (not shown) in communication with the antenna. The chip includes circuitry that enables the recovery of data and, in the case of a passive or field-powered tag, power from the signals present on the antenna as well as circuitry that enables signals to be sent from the tag to an RFID reader 150. The chip may also include additional circuitry enabling, for example, changing chip operating mode, processing of incoming data or processing of outgoing data. Thus, the chip includes diode detection, logic and memory circuits. The system also includes an RFID reader 150 that includes an antenna 155. Suitable RFID readers or base stations are known and available in the art. The RFID reader 150 is in communication with a computing system 170, for example an inventory management system, a physical access control system or a point-of-sale (POS) terminal, and is capable of receiving information from and transmitting information to the computing system 170. The computing system 170 is in communication with one or more local area or wide area networks 180, which makes possible the exchange of information with other computing systems. In order to obtain the information stored on the RFID tag, the RFID reader transmits an interrogating signal 160 using an electromagnetic signal transmitted by the RFID reader antenna. The interrogating signal is received by the RFID tag 120, and in response, the RFID tag transmits a response signal 165 containing its information that is received by the RFID reader and transmitted to the computing system, where it is processed and stored in a database.

In one embodiment, in order to protect the privacy of the user 110, the RFID tag 120 is constructed with a modifiable effective reading range for the response signal 165. For example, the range of the response signal can be controlled from a maximum range, for example about 10 meters, to a fraction of that maximum range, for example just a few centimeters. In one embodiment, modification of the response signal range includes sending a command from the RFID reader to the RFID tag that modifies the function of the chip located on the RFID tag. This command can be send before, during or after a given interrogation of the RFID tag or at the request of the user.

Figure 2:
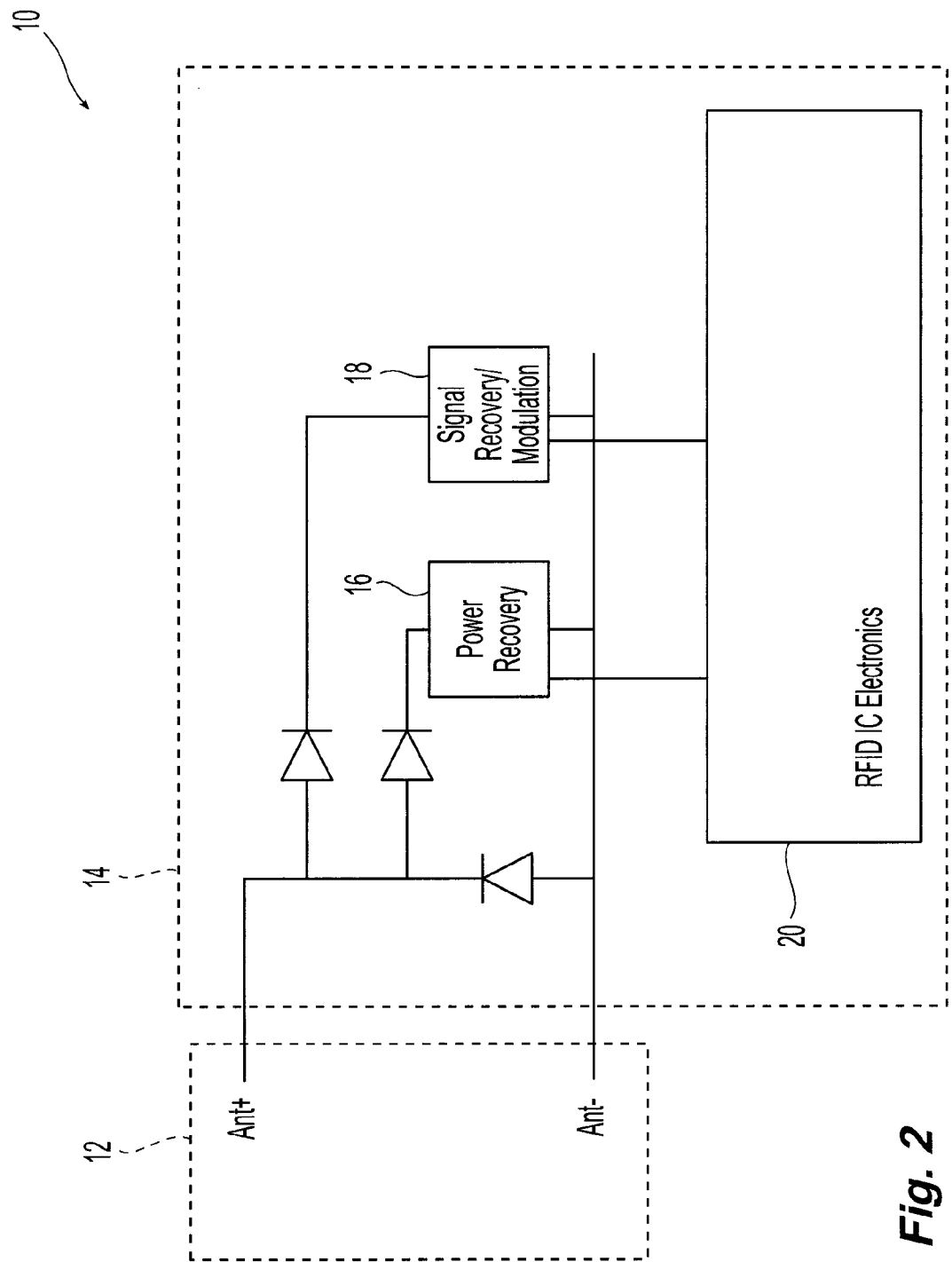
FIG. 2 is a schematic representation of an embodiment of a passive chip-type RFID tag.

An embodiment of a chip-based RFID tag 10 showing the general structures of the tag and the front end circuitry is illustrated in FIG. 2. As illustrated the RFID tag is a passive tag, although passive, semi-active and active tags can be used in accordance with the present invention. As illustrated, the RFID tag 10 includes an antenna 12 and a chip 14 in communication with the antenna. The antenna receives interrogating signals and commands from a RFID reader and communicates these signals and commands to the chip. The chip derives power from the signals, is capable of sending a response signal using backscatter and can modify the operation of the tag in response to the command. In particular, the chip can modify the effective reading distance of the tag in response to one or more commands from the RFID reader. As illustrated, the front end circuitry of the chip includes separate signal and power paths. The chip 14 includes power recovery circuitry 16 capable of recovering and storing energy from the interrogating RF field. In addition, the front end circuitry of the chip also includes signal recovery and modulation circuitry 18 that is capable of demodulating incoming data during the receive operation and of modulating the effective input impedance of the front end during the transmission via backscatter operation. The chip 14 also includes additional electronics 20 to provide for data storage and control of the tag such as random access memory, resident memory, electrically erasable programmable read-only memory (EEPROM) and control circuitry. In general, the effectiveness of power collection, signal reception and signal backscatter are all strongly dependent on the nature of the impedance relationship between the RFID IC (integrated circuit) front end and the RFID tag antenna.

Figure 3:
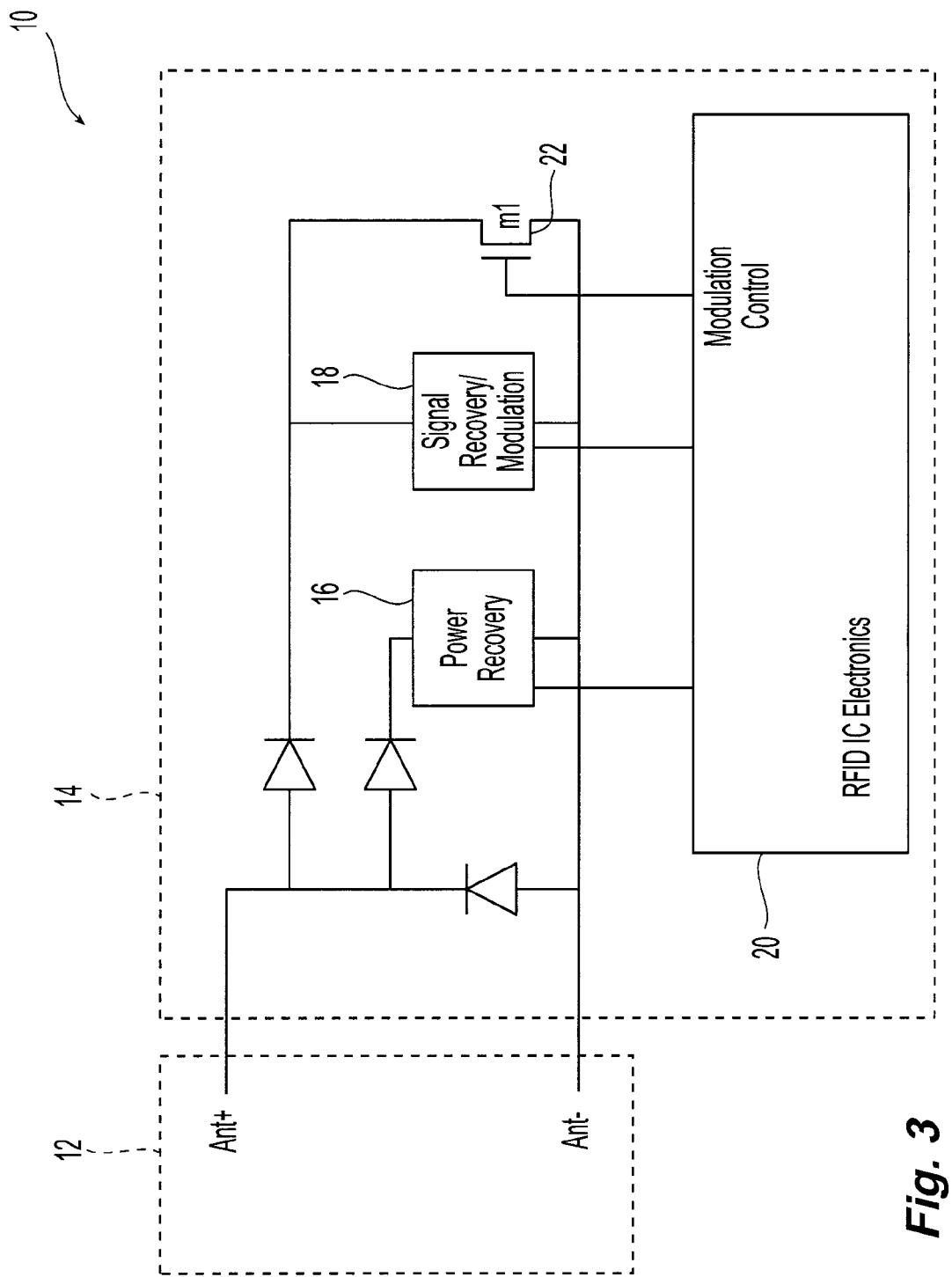
FIG. 3 is a schematic representation of an embodiment of a passive chip-type RFID tag showing a transistor for modulation control in the front end electronics of the chip.

An embodiment of the chip-based RFID tag 10 with a backscatter modulator is illustrated in FIG. 3. As illustrated, the chip 14 includes at least one field-effect transistor 22 arranged in parallel with the signal recovery circuitry 18. Preferably, the field-effect transistors used in accordance with the present invention are N-channel metal-oxide-semiconductor field-effect transistors (MOSFET or nMOSFET). In one embodiment, the MOSFET is turned on and off to effect the modulation. In the off state, the front end circuitry of the chip 14 presents one input impedance to the antenna 12. In the on state, the front end circuitry of the chip 14 presents a different input impedance to the antenna 12. These two impedance values affect the reflectivity of the overall RFID tag 10. Switching the modulation control signal on and off thus induces variations in reflectivity that can be detected by the base station. To maximize the range of the RFID tag, the reflectivity difference that is achieved through modulator control is maximized.

In order to provide the increased level of privacy that users of RFID systems desire, systems and methods in accordance with the present invention provide for the modification and in particular the reduction of the effective reading range of an RFID tag, for example after the tag has been deployed. Systems and methods in accordance with exemplary embodiments of the present invention utilize a plurality of circuits and operating conditions either alone or in combination to provide for the modification of the effective reading range of the RFID tag. These systems and methods include, but are not limited to, circuitry to provide for reducing the modulation depth of the backscatter signal, circuitry to provide for changing the overall input impedance characteristic of the tag front end, circuitry to provide for changing the power consumption characteristics of the tag, circuitry to provide for changing the value at which the tag judges incident power to be sufficient for it to operate and combinations thereof.

Figure 4:
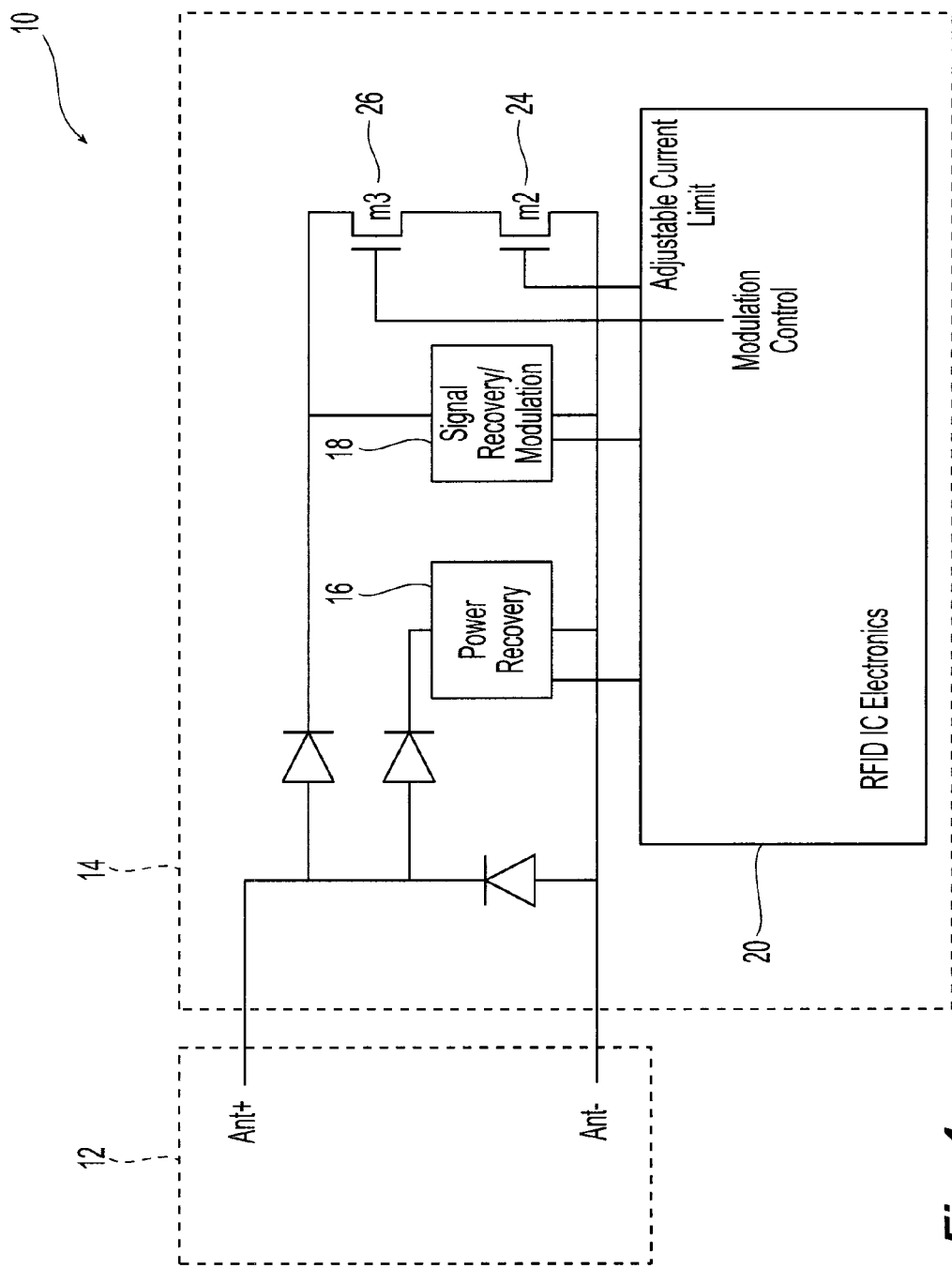
FIG. 4 is a schematic representation of one embodiment of front end electronics in the RFID tag chip in accordance with the present invention.

Referring to FIG. 4, an exemplary embodiment of an RFID tag 10 showing circuitry for reducing the modulation depth of the backscatter signal in accordance with the present invention is illustrated. As illustrated, the chip 14 includes at least two field-effect transistors 24,26 arranged in parallel with the signal recovery circuitry 18. In one embodiment, a first one of the transistors 26 is operated as a switch in the same way as the modulating transistor 22 of FIG. 3. The second one of the transistors 24 is used to limit the total current that the first transistor 26 can conduct when active. A reduction in the amount of current that is allowed to flow in the active state produces a smaller impedance difference between the two modulation states of the first transistor. This smaller impedance difference makes it harder for the RFID reader to recover the backscatter signal from the RFID tag. When the difference between the two modulation states is sufficiently small, the range or distance at which the RFID tag can be read, i.e. the effective reading range, is set by base station sensitivity limits. Analog signals, digital signals or a combination of analog and digital signals can be used to set the value of the control voltage on the second transistor 24. In addition, the control state that sets those control voltages could be temporarily set, e.g., via data storage in an EEPROM, or permanently set, e.g., via blowing an on-chip fuse. In one embodiment, the voltage of the first transistor 26 is directly controlled without the second transistor to limit the current. In addition, other configurations of two or more transistors can be used to achieve the same variable current result. Suitable RFID tags for use with this embodiment include passive, semi-active and active RFID tags.

Figure 5:
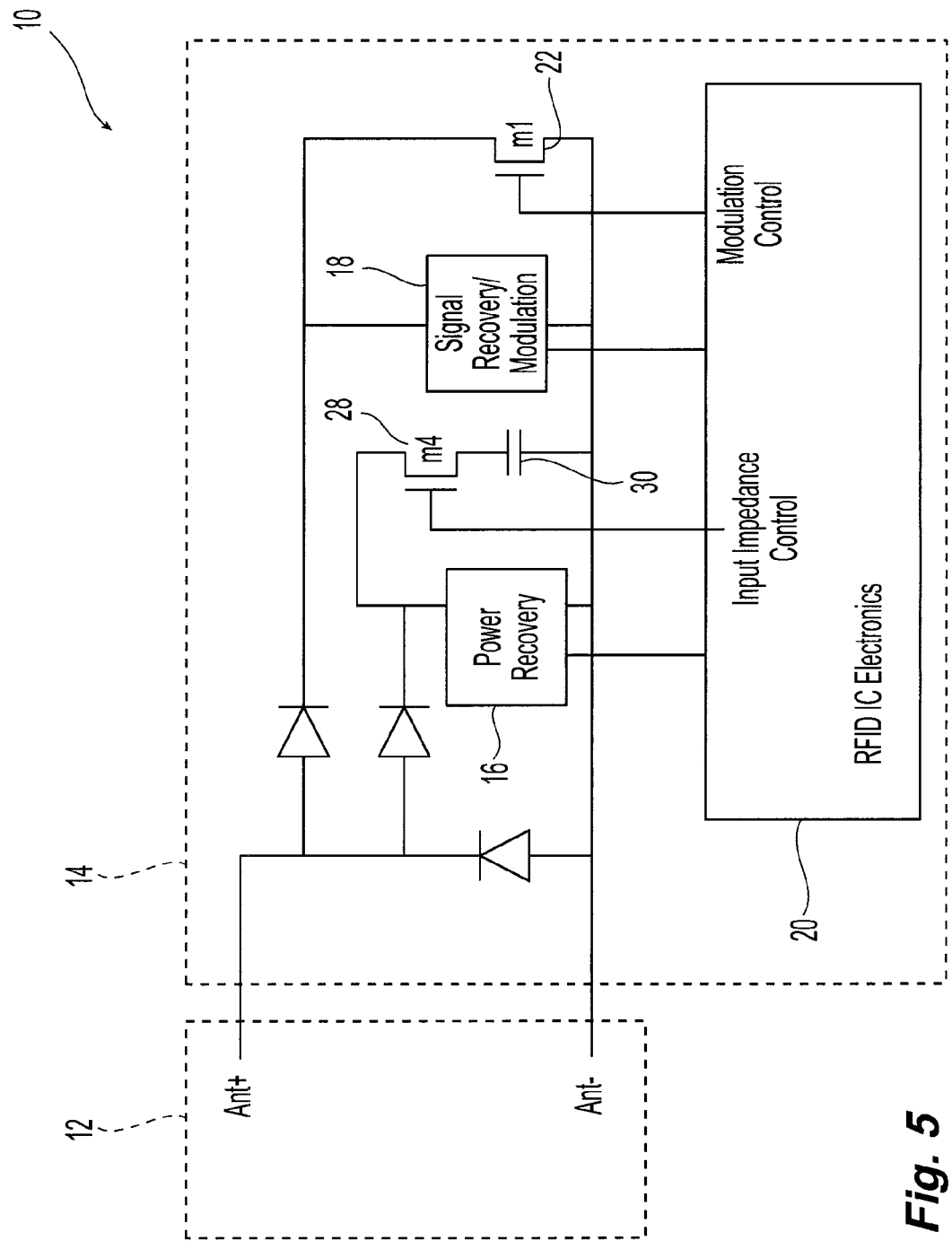
FIG. 5 is a schematic representation of another embodiment of front end electronics in the RFID tag chip in accordance with the present invention.

Referring to FIG. 5, an exemplary embodiment of an RFID tag 10 that includes circuitry to change the overall input impedance characteristic of the front end circuitry of the chip in accordance with the present invention is illustrated. As illustrated, the chip and in particular the front end circuitry of the chip, includes a field-effect transistor 28 and a capacitor 30 arranged in parallel with the power recovery circuitry 16. In accordance with the present invention, the field-effect transistor 28 acts as an RF switch. When the transistor 28 is on, the capacitor 30 connected to its source will affect the input impedance of the RFID tag. When the transistor 28 is off, the capacitor 30 will not have this effect. Changing the overall front end impedance, using the circuit shown in FIG. 5 or an alternative circuit, changes the overall impedance range of the RFID tag. Large changes in input impedance result in significant reductions in tag range. Either analog or digital signals can be used to set the value of the control voltage on the transistor switch 28. In addition, the control state that sets those control voltages could be temporarily set, e.g., via data storage in an EEPROM, or permanently set, e.g., via blowing an on-chip fuse. Suitable RFID tags for use with this embodiment include passive, semi-active and active RFID tags.

Figure 6:
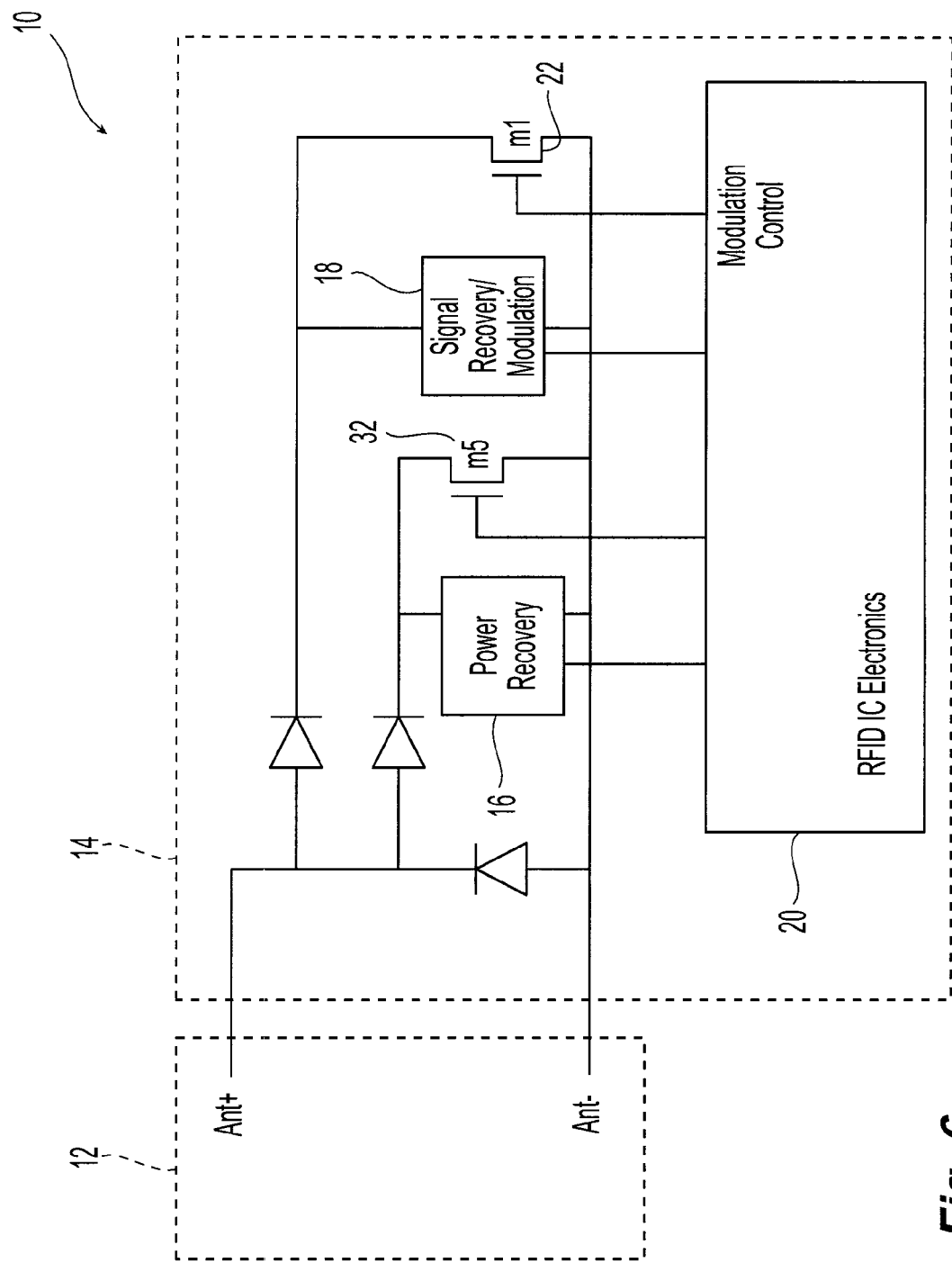
FIG. 6 is a schematic representation of another embodiment of front end electronics in the RFID tag chip in accordance with the present invention.

Referring to FIG. 6, an exemplary embodiment of an RFID tag utilizing a change in the power consumption of the tag to modify the effective operating range in accordance with the present invention is illustrated. The front end circuitry of the chip includes a field-effect transistor 32 shown in parallel with the power recovery circuitry 16. When the transistor 32 is turned on, power consumption in the RFID tag is increased. In addition, the RFID tag input impedance is also affected. The additional current drain on the power path reduces the effective reading range of the RFID tag. Analog signals, digital signals or a combination of analog and digital signals can be used to set the value of the control voltage on the transistor 32. In addition, the control state that sets those control voltages could be temporarily set, e.g., via data storage in an EEPROM, or permanently set, e.g., via blowing an on-chip fuse. Suitable RFID tags for use with this embodiment include passive RFID tags. In one embodiment, the transistor 32 or other current drain device is not placed in parallel with the power recovery circuitry 16 but may be incorporated into the power recovery circuitry 16.

Figure 7:
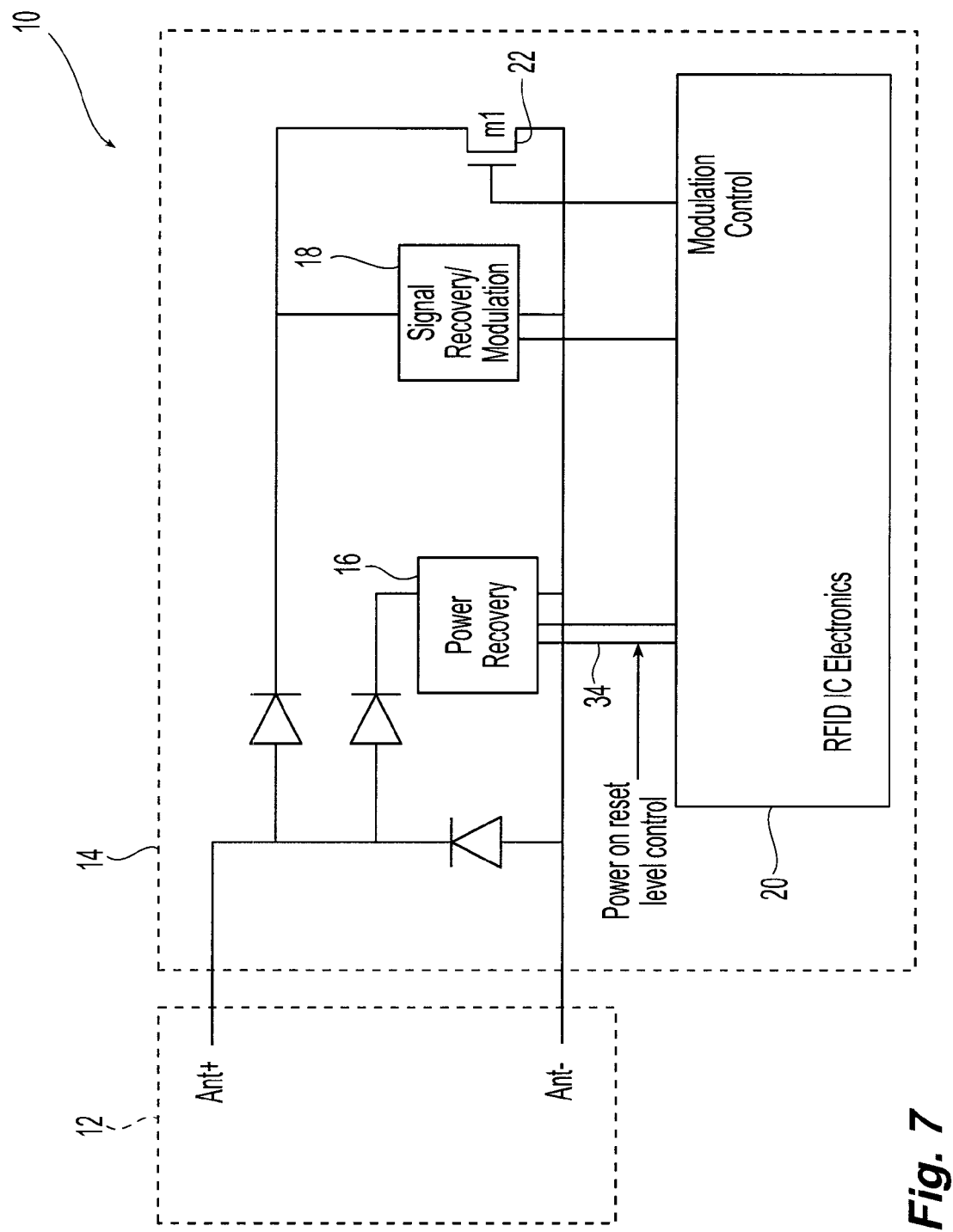
FIG. 7 is a schematic representation of another embodiment of front end electronics in the RFID tag chip in accordance with the present invention.

Referring to FIG. 7, an exemplary embodiment of an RFID tag 10 utilizing a change in the level at which the RFID tag deems incident power sufficient to operate in accordance with the present invention is illustrated. The chip includes a power-on reset circuit 34 in communication with the power recovery circuitry 16 that activates the RFID tag circuitry and enables communication when a minimum voltage is realized on the power rail of the RFID tag. The power-on reset circuit ensures that when the RFID tag is operating, all of its internal logic starts in a known state. Changing the threshold voltage of the power-on reset circuit changes the range at which the RFID tag would be able to operate. Raising this threshold voltage reduces the range of the RFID tag. Both analog and digital signals can be used to set the value of the threshold voltage of the power-on reset. In addition, the threshold voltage could be temporarily set, e.g., via data storage in an EEPROM, or permanently set, e.g., via blowing an on-chip fuse. Suitable RFID tags for use with this embodiment include passive RFID tags.

Figure 8:
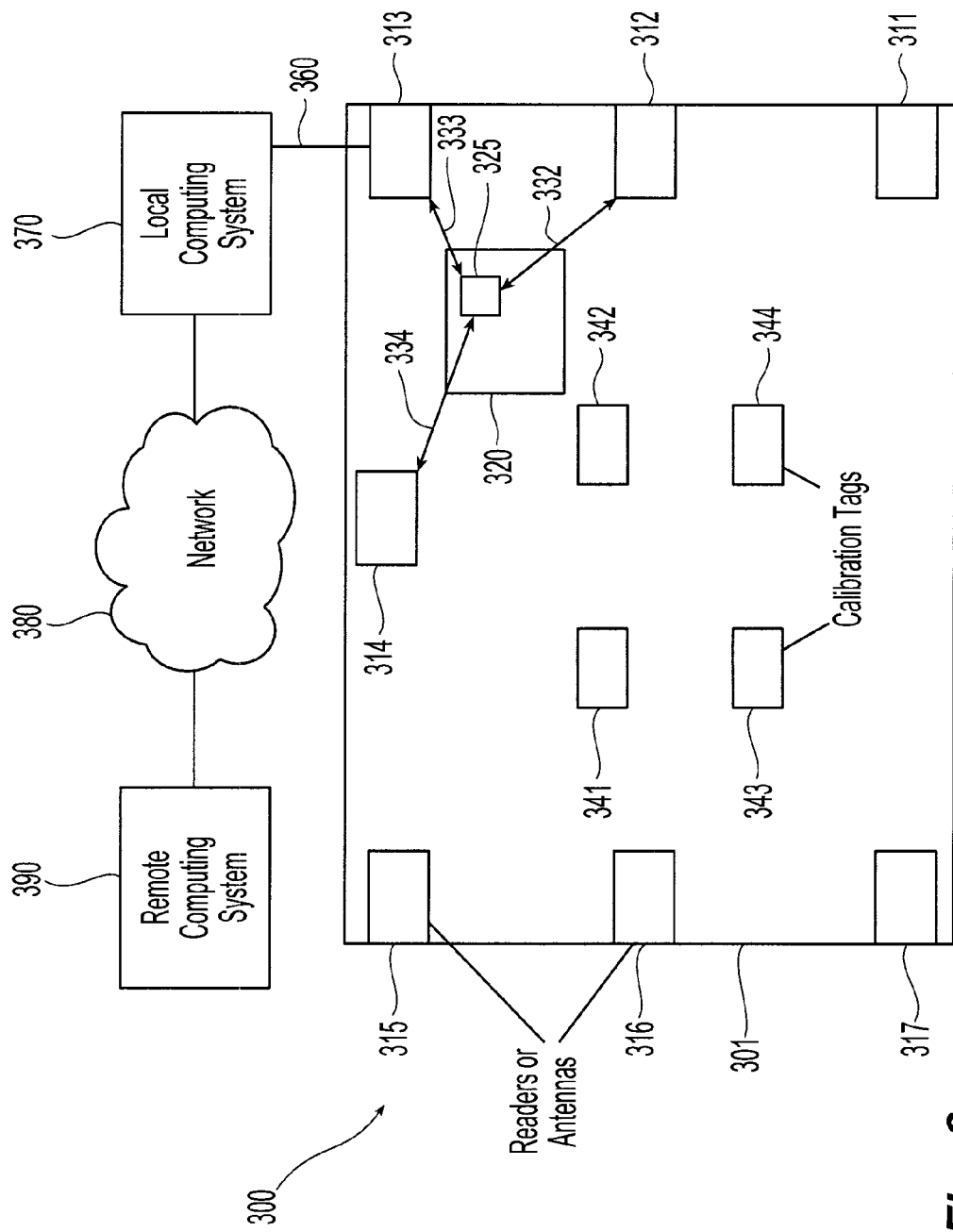
FIG. 8 is a schematic representation of an embodiment of an application environment for the modifiable RFID system of the present invention.

Referring to FIG. 8, an exemplary embodiment of an application environment 300 for use with the RFID systems and methods of the present invention is illustrated. The application environment illustrates localization or location of RFID tags for use in locating individual items in a retail storage area or on the floor of a retail establishment, for locating items in a warehouse, for locating patients or newborn babies in a hospital and for locating animals within a zoo, among other applications. In accordance with one embodiment, a modified over-the-air protocol is used in which the output amplitude of the RFID tag can be programmatically changed by a factor k, which varies from zero to 100%. This factor k is set by the RFID reader or interrogation device. Information about the signal received from a given RFID tag such as the received signal strength indicator (RSSI) at a given RFID reader's antenna or the fact that a given tag is readable or not is correlated to the factor k and the distance and orientation of the tag relative to the transducer's antenna. By using multiple transducers or a single transducer with multiple antennas strategically positioned throughout a physical space, the position and orientation of a given RFID tag can be determined without additional equipment.

As illustrated, a given monitored region 301, for example a warehouse or retail establishment, is equipped with an array of RFID readers or antennas connected to a single reader, 311, 312, 313, 314, 315, 316, 317. One of the transducers, for example the transducer 313 controlling the transducer array or antenna array is connected by wired or wireless means 360 to a local computing system 370. The local computing system is connected to one or more networks 380 including local area networks and wide area networks such the Internet and is in communication with at least one remote computing system 390 through the network. Within the monitored region 301 is at least one and alternatively a plurality of objects 320. Suitable objects include, but are not limited to, an individual item, a case containing many items, a pallet, a person or an animal. Each object 320 is tagged with an RFID tag 325. Suitable RFID tags include RFID tags in accordance with the present invention that include circuitry that provides for the modification of the effective reading range of the RFID tag in response, for example, to commands received from a RFID reader. By varying the output amplitude of the RFID tag from about zero to about 100 percent, the distances 332, 333, 334, to one or more sets of RFID readers or antennas 312, 313, 314 can be determined.

In one embodiment, distances as a function of amplitude are established through the use of a set of calibration units or calibration RFID tags 341, 342, 343, 344 disposed in the monitored region 301. An example of the use of a positioning system to establish the locations of calibration tags is disclosed in U.S. published patent application no. 2006/0061476. As described, the location of the tags is determined by an Ekahau Positioning Engine, which uses the signal strengths of wireless access points as measured as the wireless card of a client system to determine the position of the client system that simultaneously uses an RFID reader to record the presence of an RFID calibration tag at the determined location.

Once the distances to three or more calibration RFID tags or antennas are established, the computing system uses this calibration information to determine the location of the transponder or tag 325. For objects arranged in a plane, the distances to three RFID readers are sufficient to establish the location of the RFID tag 325 and hence the tagged object 320. Four such distances may be required for locating RFID tags in a three dimensional space. Since the radiation sent by each RFID tag is not necessarily isotropic, the precision of the location system will be enhanced by the use of RFID tags and RFID reader antennas having radiation patterns in the plane of location close to isotropic. Suitable tags and readers include circular polarization reader antennas and tags. Suitable circular polarization reader antennas and tags are commercially available from Alien Technology of Morgan Hill, Calif., Symbol Technologies, Inc. of Holtsville, N.Y. and the Intemec Technologies Corporation of Everett, Wash.

Therefore, tagged objects or persons within the range of the array of RFID readers or antennas can be located. This will enable locating specific objects on the shelves of a warehouse or on the sales floor of a retail store. Such a system will aid in the taking of inventory, the discovery of out-of-stock-items, which will not return a signal to the reader, and the location of specific items in a warehouse for the replenishment of out-of-stock items.

Figure 9:
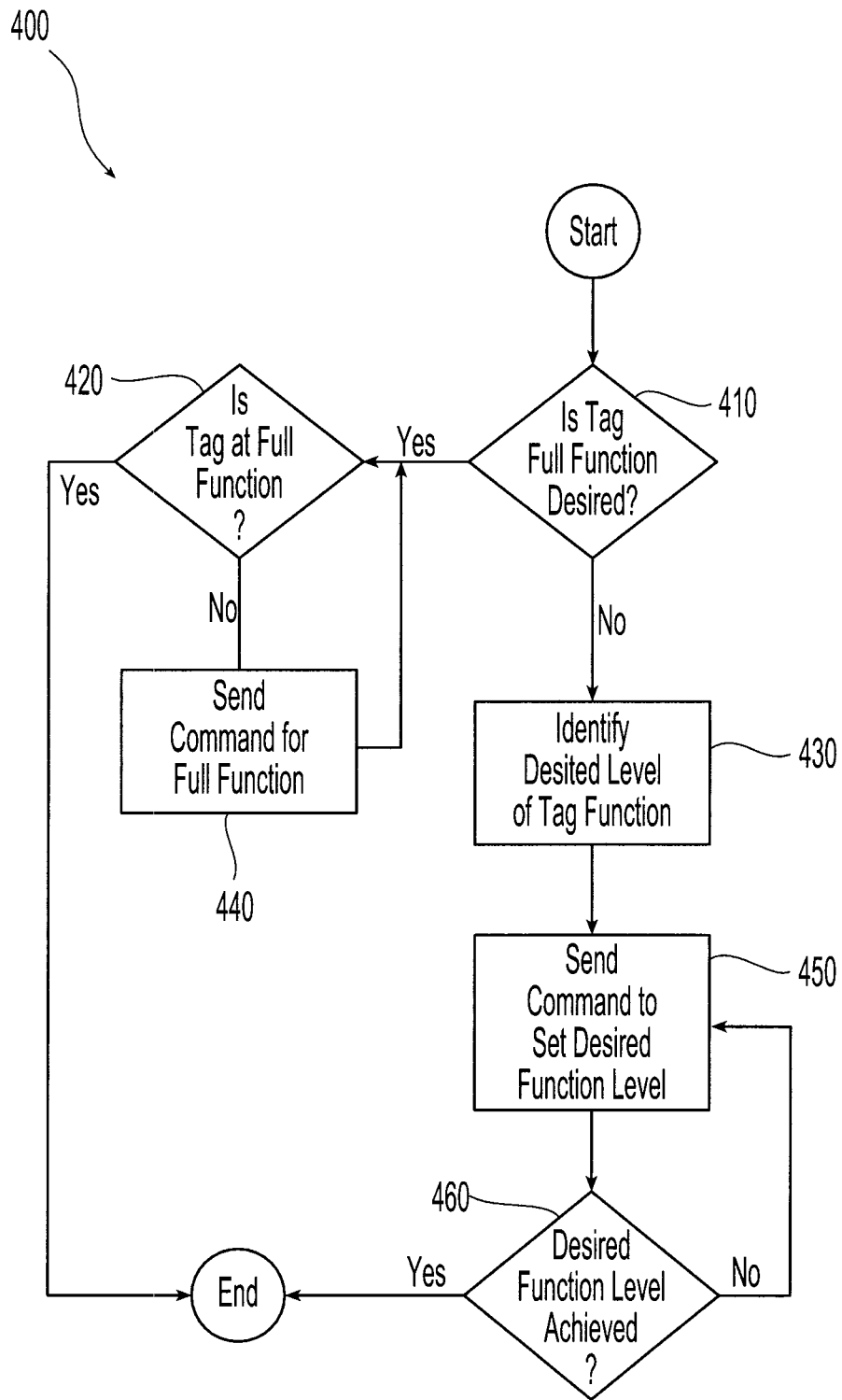
FIG. 9 is a flow chart illustrating an embodiment of a method for modifying the effective reading range of an RFID tag in accordance with the present invention.

Referring to FIG. 9, an exemplary embodiment of a method for modifying the output of an RFID tag 400 to a level such as to reduce the effective reading range of the RFID tag in accordance with the present invention is illustrated. In order to be able to assure a user that a given RFID tag has been deactivated, partially deactivated or disabled, confirmation of the deactivation of an RFID tag is provided using electronic confirmation. Initially, a determination is made regarding whether or not full function, i.e. maximum range is desired in the RFID tag 410. If full function is desired, a test is performed, for example using an RFID reader, to determine if an RFID tag is at full function 420, i.e. maximum effective reading range. If the tag is not at full function, then a command is sent to the RFID tag to place the tag at full function 440, and the RFID is retested. This process is continued until the RFID tag is determined to be at full function. If full function is not desired, the desired level of RFID tag function is identified 430 and a command is send to the RFID tag to place the tag at the desired level of function 450. For example, the RFID tag can be deactivated by sending a deactivation or disable command from the reader to the tag. A check is then made to determine if the RFID tag is at the desired level 460. If not, then the command is resent, and the tag is retested until the desired function level is achieved in the RFID tag.

In one exemplary method for controlling a radio frequency identification system in accordance with the present invention, at least one command is communicated from a radio frequency identification reader or base station to a chip-based radio frequency identification tag or transponder. This command can be communicated before, during or after an interrogation signal is sent from the reader to the tag. The RFID tag includes an antenna and a chip in communication with the antenna. The chip includes the electrical and electronic circuitry required for the operation of the tag and for providing responses and information to the reader. The command is received by the antenna and communicated to the chip, and the chip interprets and processes the command. In response to the communicated command, the effective reading range of the radio frequency identification tag is modified. The effective reading range of the tag can be temporarily or permanently modified.

In one embodiment, the modification of the effective reading range of the RFID tag involves adjusting the effective reading range between a maximum reading range and a minimum reading range. For security purposes, modification of the effective reading range would involve adjusting the effective reading range to the minimum reading range. In one embodiment, modification of the effective reading range includes reducing the modulation depth of the backscatter signal transmitted by the radio frequency identification tag in response to the interrogation signal from the radio frequency identification reader. In order to reduce the modulation depth, the impedance difference between the two modulation states, i.e. the impedance values between the antenna and the chip, is limited. In another embodiment, the effective reading range is modified by modifying the impedance characteristics of front end electronics in the chip.

In one embodiment, modification of the effective reading range involves modifying the power consumption characteristics of the radio frequency identification tag. Modification of the power consumption characteristics includes incorporating at least one additional power drain in the power path of the tag. For example, a field-effect transistor can be placed into the power path to increase tag power consumption. In one embodiment, modification of the effective reading ranged of the RFID tag is accomplished by modifying the level of incident power sufficient to operate the chip in the tag. For example, the threshold voltage of a power-on reset circuit capable of activating circuitry in the chip is changed or preferably increased.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order.

Therefore, it will be understood that the appended claims are intended to cover all such modifications and embodiments, which would come within the spirit and scope of the present invention.

What is claimed is:

1. A method for controlling a radio frequency identification system, the method comprising:
   communicating at least one command from a radio frequency identification reader to a chip-based radio frequency identification tag comprising an antenna and a chip in communication with the antenna, the chip comprising power recovery circuitry in communication with the antenna and configured to recover and store energy from the interrogating signals, signal recovery circuitry separate from the power recovery circuitry, in communication with the antenna and configured to demodulate incoming data and tag control electronics in communication with the power recovery circuitry and signal recovery circuitry and configured to control the power recovery circuitry and signal recovery circuitry;
   modifying an effective reading range of the radio frequency identification tag in response to the communicated command by:
      controlling a modulation depth of backscatter radiation that the radio frequency identification tag uses to communicate with the radio frequency identification reader using a field-effect transistor comprising a drain and source configured in parallel with the signal recovery circuitry and a gate in communication with the tag control electronics; and
      modifying power consumption characteristics of the radio frequency identification tag using a field-effect transistor comprising a drain and source configured in parallel with the power recovery circuitry and a gate in communication with the tag control electronics.

2. The method of claim 1, wherein the step of modifying the effective reading range further comprises adjusting the effective reading range between a maximum reading range and a minimum reading range.

3. The method of claim 1, wherein the step of modifying the effective reading range further comprises reducing the modulation depth of a backscatter signal transmitted by the radio frequency identification tag in response to an interrogation signal from the radio frequency identification reader.

4. The method of claim 3, wherein the step of reducing the modulation depth further comprises:
   modulating impedance values between the antenna and the chip between two modulation states; and
   limiting impedance difference between the two modulation states.

5. The method of claim 1, wherein the step of modifying the effective reading range further comprises modifying impedance characteristics of front end electronics in the chip.

6. The method of claim 1, further wherein the step of modifying power consumption characteristics further comprises incorporating capacitor in series with the field effect transistor.

7. The method of claim 1, wherein the step of modifying the effective reading range further comprises modifying a level of incident power sufficient to operate the chip in the tag.

8. The method of claim 7, wherein the step of modifying the level of incident power further comprises changing a threshold voltage of a power-on reset circuit capable of activating circuitry in the chip.

9. A radio frequency identification system comprising:
   a radio frequency identification tag capable of receiving interrogation signals and commands from a radio frequency identification reader, the radio frequency identification tag comprising:
   an antenna; and
   a chip in communication with the antenna and comprising circuitry configured to modify an effective reading range of the radio frequency identification tag, the circuitry comprising:
      power recovery circuitry in communication with the antenna and configured to recover and store energy from the interrogating signals;
      signal recovery circuitry separate from the power recovery circuitry, in communication with the antenna and configured to demodulate incoming data;
      tag control electronics in communication with the power recovery circuitry and signal recovery circuitry and configured to control the power recovery circuitry and signal recovery circuitry;
      power consumption modification circuitry arranged in parallel with the power recovery circuitry and configured to modify power consumption characteristics of the radio frequency identification tag, the power consumption modification circuitry comprising a field-effect transistor comprising a drain and source configured in parallel with the power recovery circuitry and a gate in communication with the tag control electronics; and impedance modulation circuitry arranged in parallel with the signal recovery circuitry and configured to control a modulation depth of backscatter radiation that the radio frequency identification tag uses to communicate with the radio frequency identification reader, the impedance modulation circuitry comprising a field-effect transistor comprising a drain and source configured in parallel with the signal recovery circuitry and a gate in communication with the tag control electronics.

10. The system of claim 9, wherein the impedance modulation circuitry comprises two field-effect transistors arranged in series, each field-effect transistor comprising a drain and source configured in parallel with the signal recovery circuitry and a gate in communication with the tag control electronics.

11. The system of claim 10, wherein the field effect transistors comprise N-channel metal-oxide-semiconductor field-effect transistors.

12. The system of claim 9, wherein:

the signal recovery circuitry is further configured to modulate an effective input impedance of the circuitry during transmission of the backscatter radiation; and the power consumption modification circuitry further comprises a capacitor in series with the field effect transistor.

13. The system of claim 12, wherein the field effect transistor comprises an N-channel metal-oxide-semiconductor field-effect transistor.

14. The system of claim 9, wherein the power recovery circuitry comprises a power on reset circuit.

* * * * *